(12) United States Patent
Yoshimura et al.

(10) Patent No.: US 10,130,031 B2
(45) Date of Patent: Nov. 20, 2018

(54) WALK BEHIND MOWER

(71) Applicant: HONDA MOTOR CO., LTD., Tokyo (JP)

(72) Inventors: Hajime Yoshimura, Wako (JP); Yasumi Fukuzumi, Wako (JP); Jun Fukano, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/455,295

(22) Filed: Mar. 10, 2017

(65) Prior Publication Data

US 2017/0265385 A1 Sep. 21, 2017

(30) Foreign Application Priority Data

Mar. 17, 2016 (JP) ................................. 2016-053495

(51) Int. Cl.
*F16D 41/10* (2006.01)
*A01D 34/68* (2006.01)
(Continued)

(52) U.S. Cl.
CPC ....... *A01D 34/6812* (2013.01); *A01D 34/006* (2013.01); *A01D 34/69* (2013.01);
(Continued)

(58) Field of Classification Search
CPC ........ F16D 41/10; F16D 41/125; F16D 41/16; F16D 41/185
(Continued)

(56) References Cited

U.S. PATENT DOCUMENTS 3,999,643 A * 12/1976 Jones ................. A01D 34/6806
180/53.7
5,274,987 A * 1/1994 Wiener ................ A01D 34/001
192/50
(Continued)

FOREIGN PATENT DOCUMENTS

JP H11119631 A 4/1999
JP 2007318866 A 12/2007

OTHER PUBLICATIONS

Office Action of Japanese Patent Application No. 2016-053495, dated May 30, 2017, 2 pages.

*Primary Examiner* — Jeffrey J Restifo
(74) *Attorney, Agent, or Firm* — Armstrong Teasdale LLP (57) ABSTRACT

In a walk behind mower (10) including a clutch (23) provided in a power transmission path between an electric motor (35) and driven wheels (13), a clutch actuating mechanism (24) interposed between the electric motor and the clutch for selectively engaging the clutch, and a control unit (140) for selectively supplying electric power from a power source to the electric motor according to a command from an operation switch (30), the clutch actuating mechanism includes a cam mechanism for engaging the clutch by using a force transmitted to an input end (23a) of the clutch in the power transmission path when the electric motor is being driven in a normal rotational direction, and the control unit is configured to drive the electric motor in a reverse rotational direction for a prescribed period of time before stopping supplying electric power to the electric motor when a command to stop supplying electric power to the electric motor is received from the operation switch.

11 Claims, 8 Drawing Sheets

(51) Int. Cl.
*A01D 34/00* (2006.01)
*A01D 34/69* (2006.01)
*A01D 69/02* (2006.01)
*F16D 11/14* (2006.01)
*F16D 23/12* (2006.01)
*A01D 101/00* (2006.01)
*F16D 11/00* (2006.01)
*F16H 1/14* (2006.01)

(52) U.S. Cl.
CPC .............. *A01D 69/02* (2013.01); *F16D 11/14* (2013.01); *F16D 23/12* (2013.01); *A01D 2101/00* (2013.01); *F16D 2011/008* (2013.01); *F16D 2023/123* (2013.01); *F16H 1/14* (2013.01)

(58) Field of Classification Search
USPC ...... 180/65.6, 65.27, 19.3; 192/41 S, 47, 49, 192/50
See application file for complete search history.

(56) References Cited

U.S. PATENT DOCUMENTS

| | | | | |
|---|---|---|---|---|
| 5,718,105 A | * | 2/1998 | Irikura | A01D 34/69 180/19.1 |
| 5,752,373 A | * | 5/1998 | Cappo | A01D 34/69 180/19.3 |
| 5,778,645 A | * | 7/1998 | Irikura | A01D 34/69 56/11.8 |
| 5,850,758 A | * | 12/1998 | McCloud | F16H 3/083 74/371 |
| 5,857,315 A | * | 1/1999 | Keane | A01D 43/16 172/14 |
| 5,887,484 A | * | 3/1999 | Abend | A01D 34/69 180/19.1 |
| 6,085,507 A | * | 7/2000 | Keane | A01D 43/16 172/14 |
| 6,625,963 B2 | * | 9/2003 | Johnson | F16H 61/16 56/10.8 |
| 6,655,515 B2 | * | 12/2003 | Cox | F16D 41/088 192/38 |
| 6,848,523 B2 | * | 2/2005 | Ishikawa | F16D 43/284 180/19.3 |
| 7,073,648 B2 | * | 7/2006 | Ishikawa | F16D 41/12 192/39 |
| 7,175,012 B2 | * | 2/2007 | Ruebusch | A01D 34/69 192/48.8 |
| 7,210,567 B2 | * | 5/2007 | Cibien | F16D 13/025 192/48.8 |
| 7,665,589 B2 | * | 2/2010 | Blanchard | A01D 34/69 192/46 |
| 7,669,702 B2 | * | 3/2010 | Blanchard | A01D 34/69 180/76 |
| 7,739,870 B2 | * | 6/2010 | Carlson | F16H 61/4035 60/454 |
| 7,777,444 B2 | * | 8/2010 | Kawakami | A01D 34/69 318/362 |
| 7,850,555 B2 | * | 12/2010 | Keane | A01D 69/08 474/11 |
| 8,851,256 B2 | * | 10/2014 | Blanchard | A01D 34/6812 192/48.5 |
| 9,759,300 B2 | * | 9/2017 | Barendrecht | F16D 41/04 |
| 2002/0034994 A1 | * | 3/2002 | Johnson | F16H 63/062 474/11 |
| 2003/0089570 A1 | * | 5/2003 | Ochab | F16D 21/08 192/50 |
| 2003/0155204 A1 | * | 8/2003 | Demir | F16D 41/185 192/46 |
| 2006/0289225 A1 | * | 12/2006 | Blanchard | A01D 34/69 180/337 |

* cited by examiner

WALK BEHIND MOWER

TECHNICAL FIELD

The present invention relates to a walk behind lawn mower provided with at least one driven wheel for propelling the mower.

BACKGROUND ART

A walk behind lawn mower is typically provided with a pair of rear wheels that can be selectively powered by pivoting a drive lever consisting of a half loop lever provided on a handlebar of the mower toward the cross member of the handlebar. A drive clutch is provided between the engine of the mower and the rear wheels, and the drive lever enables the operator to selectively disconnect the transmission path between the engine and the rear wheels by means of the drive clutch.

The dog clutch is known in the art, and has the advantage of being compact and simple in structure. U.S. Pat. No. 7,669,702 discloses the use of a pair of dog clutches to accommodate the difference in the rotational speed between the two rear wheels during the cornering of the mower.

During the normal mowing operation, the driven rear wheels are highly effective in reducing the effort required by the operator. However, when mowing the grass on a slope, the operator may desire to selectively power the rear wheels. More specifically, whereas it is desirable to power the rear wheels when mowing uphill, it is desirable to disconnect the power when mowing downhill. When mowing the grass on a slope, the operator typically stands under the slope, and pushes the mower uphill using the power of the engine and pulls back the mower downhill using the gravitational force with the power to the rear wheels disconnected. Pushing and pulling the mower back and forth also occur in other situations such as when mowing grass in spatially tight areas and areas adjoining fences and other obstacles.

More recently, electrically powered mowers that offer the advantages of lower emission levels and lower noise levels have been introduced. The cutter blade may be powered either by an internal combustion engine or an electric motor, but it is particularly advantageous to use an electric motor to power the driven wheels of the mower owing to the advantage of simplifying the transmission system for transmitting the power of the power source to the driven wheels. The inventors of this application have also noted a new possibility in an increased freedom in controlling the power that can be transmitted from the electric motor to the driven wheels.

SUMMARY OF THE INVENTION

The present invention was made in view of such a recognition of the inventors and problems associated with the prior art, and has a primary object to provide a walk behind mower which is convenient to operate.

To achieve such an object, the present invention provides a walk behind mower (10) including a driven wheel (13) rotatably supported by a body frame (11), an electric motor (35) for selectively driving the driven wheel, a clutch (23) provided in a power transmission path between the electric motor and the driven wheel, a clutch actuating mechanism (24) interposed between the electric motor and the clutch for selectively engaging the clutch, and a control unit (140) for selectively supplying electric power from a power source to the electric motor according to a command from an operation switch (30); wherein the clutch actuating mechanism includes a cam mechanism for engaging the clutch by using a force transmitted to an input end (23a) of the clutch in the power transmission path when the electric motor is being driven in a normal rotational direction; and wherein the control unit is configured to drive the electric motor in a reverse rotational direction for a prescribed period of time before stopping supplying electric current to the electric motor when a command to stop supplying electric current to the electric motor is received from the operation switch.

By reversing the rotational direction of the electric motor when the supply of electric power to the electric motor is stopped, the clutch is automatically disconnected so that the rear wheels are placed in a freely rotatable condition for the convenience of the operator. The operator is thereby enabled to push and pull the mower back and forth at will so that the mowing work on a slope or a spatially tight area can be facilitated. For instance, when backing up the mower on an uphill, the gravitational force helps the operator in handling the mower in a favorable manner.

The prescribed time period or the prescribed angle may be substantially equal to a time period or an angle required for disengaging the clutch from an engaged state thereof by using the cam mechanism. Thereby, the electric motor will be reversed only for a short time period required for disengaging the clutch, and any unnecessary reverse rotation of the electric motor can be avoided. When using the angular position of the input end side of the clutch for controlling the reverse rotation of the electric motor, the prescribed angle may be determined by using a rotational angle sensor for detecting the rotational angle of the motor drive shaft, the drive gear or the driven gear. Alternatively, the prescribed time period or the prescribed angle may consist of a fixed value. Thereby, the manufacturing cost can be minimized while ensuring a favorable handling of the mower.

Typically, the clutch consists of a dog clutch, the input end of the dog clutch including an input disk (23a) and a plurality of teeth (231) extending axially from a side of the input disk at a regular angular interval in a coaxial manner, and an output end of the dog clutch including an output disk (23b) coaxially opposing the input disk and including a plurality of teeth (232) extending axially from a side of the output disk facing the input disk at a regular angular interval in a coaxial manner. Thereby, the durability of the clutch can be improved, and the size and cost of the clutch can be minimized.

Preferably, each tooth of the dog clutch is provided with an upright surface and a ramp surface on respective circumferential ends thereof such that the opposing upright surfaces abut each other when the dog clutch is being driven in the normal rotational direction and the ramp surfaces abut each other when the dog clutch is being driven in the reverse rotational direction.

Thereby, the clutch is enabled to positively transmit power when the motor is driven in the normal direction owing to the upright surfaces and the clutch is caused to automatically disengaged from each other when the motor is driven in the normal direction owing to the ramp surfaces.

Additionally or alternatively, a spring may be interposed between the input end and the output end of the dog clutch to urge the input end and the output end of the dog clutch away from each other so that the dog clutch may be disengaged in a reliable manner as soon as the electric motor has ceased to be driven in the normal rotational direction.

According to a particularly preferred embodiment of the present invention, the mower further includes an axle shaft (25) having a pair of driven wheels (13) fixedly attached to either end thereof and rotatably supported by the body frame (11), a driven gear (22) attached to an intermediate part of the axle shaft, and a drive gear (21) rotatably supported by the body frame and connected to a drive shaft of the electric motor; wherein the dog clutch is coaxially mounted on the axle shaft in such a manner that the output end is fixedly secured to the axle shaft and the input end is rotatably supported on the axle shaft, and the clutch actuating mechanism (24) comprises at least one axial projection (230) projecting from one of the input end and the driven gear, and at least one recess (220) provided in the other of the input end and the driven gear, the cam mechanism being formed between the projection and the recess in such a manner that the input end is displaced toward the output end when the drive force in the normal direction transmitted from the electric motor is transmitted to the clutch actuating mechanism. Typically, the cam mechanism includes a ramp surface formed in the at least one projection.

Preferably, the drive gear comprises a bevel gear fixedly attached to the drive shaft of the electric motor extending vertically, and the driven gear comprises a bevel gear rotatably supported by the axle shaft in a coaxial relationship.

Thereby, the power transmission system of the mower can be constructed in a highly compact manner.

DESCRIPTION OF THE PREFERRED EMBODIMENT(S)

A preferred embodiment of the present invention is described in the following with reference to the appended drawings.

Figure 1:
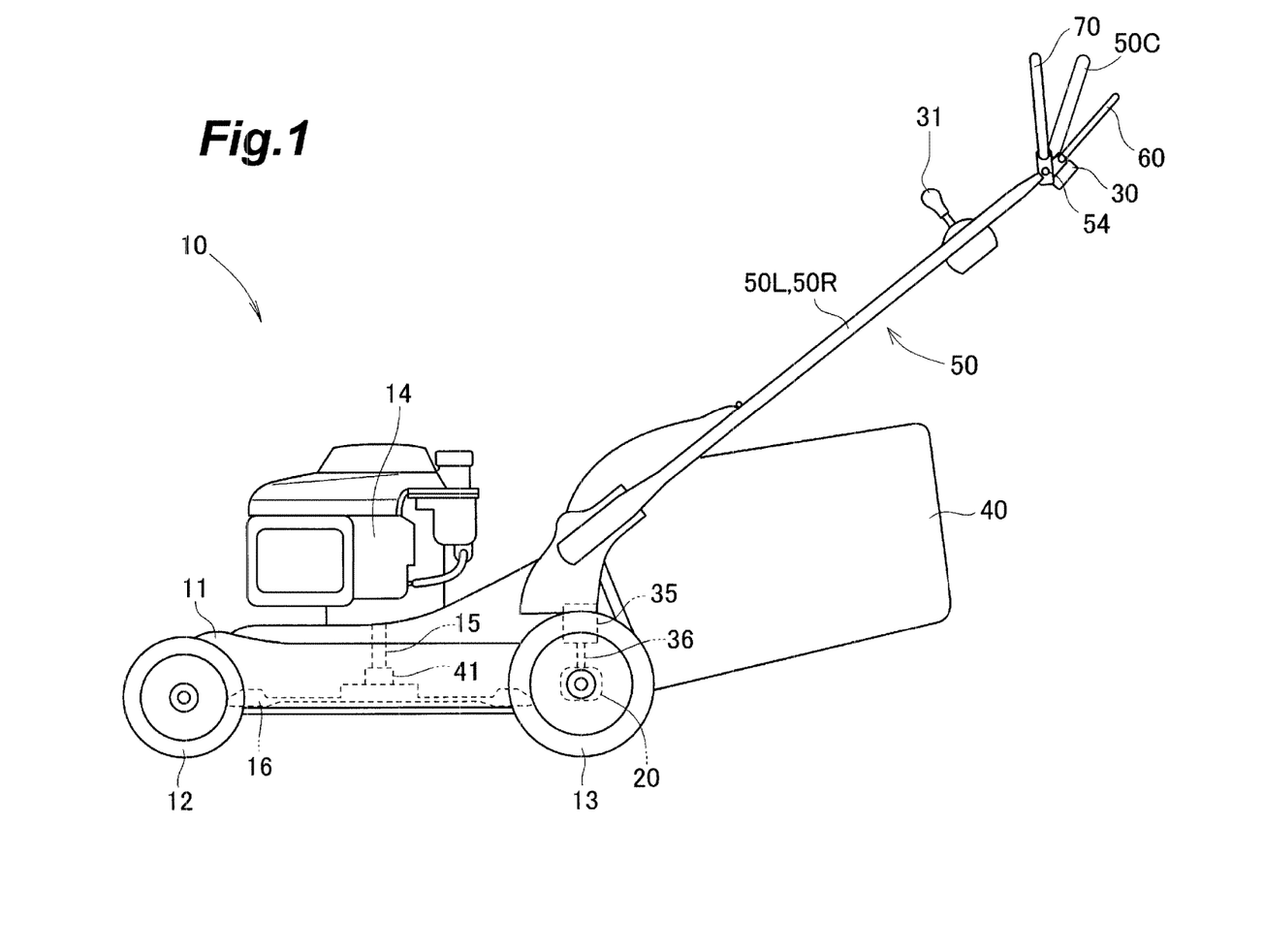
FIG. 1 is a left side view of a walk behind mower embodying the present invention.

As shown in FIG. 1 which is a side view of a walk behind lawn mower 10 embodying the present invention, the mower 10 of the illustrated embodiment includes a body frame 11, a pair of front wheels 12 positioned on either side of a front part of the body frame 11, and a pair of rear wheels 13 positioned on either side of a rear part of the body frame 11. While the front wheels 12 are free rolling wheels, the rear wheels 13 are powered or are driven wheels as will be described hereinafter.

An engine 14 consisting of a vertical internal combustion engine (having a vertically extending crankshaft or an output shaft 15) is mounted on top of the body frame 11, and a cutter blade 16 is positioned centrally under the body frame 11, and is powered directly by the engine 14. More specifically, the output shaft 15 of the engine 14 is connected to the cutter blade 16, and is provided with a flywheel brake 41.

The mower 10 further comprises an electric motor 35 fixedly attached to the body frame 11 and having a downwardly extending drive shaft 36, and a transmission system 20 provided between the drive shaft 36 and the rear wheels 13. The rear wheels 13 are thus driven by the electric motor 35.

The mower 10 is further provided with a handle bar 50 having a pair of side rod members 50L and 50R extending obliquely rearwardly from a rear end of the body frame 11 and a cross member 50C extending laterally between the rear ends of the side rod members 50L and 50R. A flywheel brake lever 60 and a drive lever 70, each consisting of a half loop member, are pivotally attached to upper parts of the side rod members 50L and 50R at respective ends. An operation switch 30 is provided on a pivot shaft 54 for the drive lever 70 for manually turning on and off the electric motor 35 by the pivoting of the drive lever 70. An engine throttle/choke lever 31 is attached to an intermediate part of the left side rod member 50L, and is connected to the corresponding part of the carburetor of the engine 14 via a cable although not shown in the drawings.

The flywheel brake lever 60 is connected to the flywheel brake 41 such that the flywheel brake 41 is released (and the ignition circuit not shown in the drawings is closed at the same time) when the flywheel brake lever 60 is held against the cross member 50C. When the flywheel brake lever 60 is released, and pivoted away from the cross member 50C, a brake is applied to the engine 14, and the ignition circuit opens.

When the drive lever 70 is released, and pivoted away from the cross member 50C, the supply of electric power to the electric motor 35 is discontinued, and the rear wheels 13 receive no power from the electric motor 35. When the drive lever 70 is held against the cross member 50C, the supply of electric power to the electric motor 35 is resumed so that the mower 10 is propelled forward under the power of the electric motor 35.

When starting the engine 14, only the flywheel brake lever 60 is held against the cross member 50C. Once the engine 14 has started, the operator additionally holds the drive lever 70 against the cross member 50C, and the mower 10 is propelled forward so that the lawn mowing can be initiated. The grass clippings cut by the cutter blade 16 are blown into a grass bag 40 attached to the rear end of the body frame 11.

Figure 2:
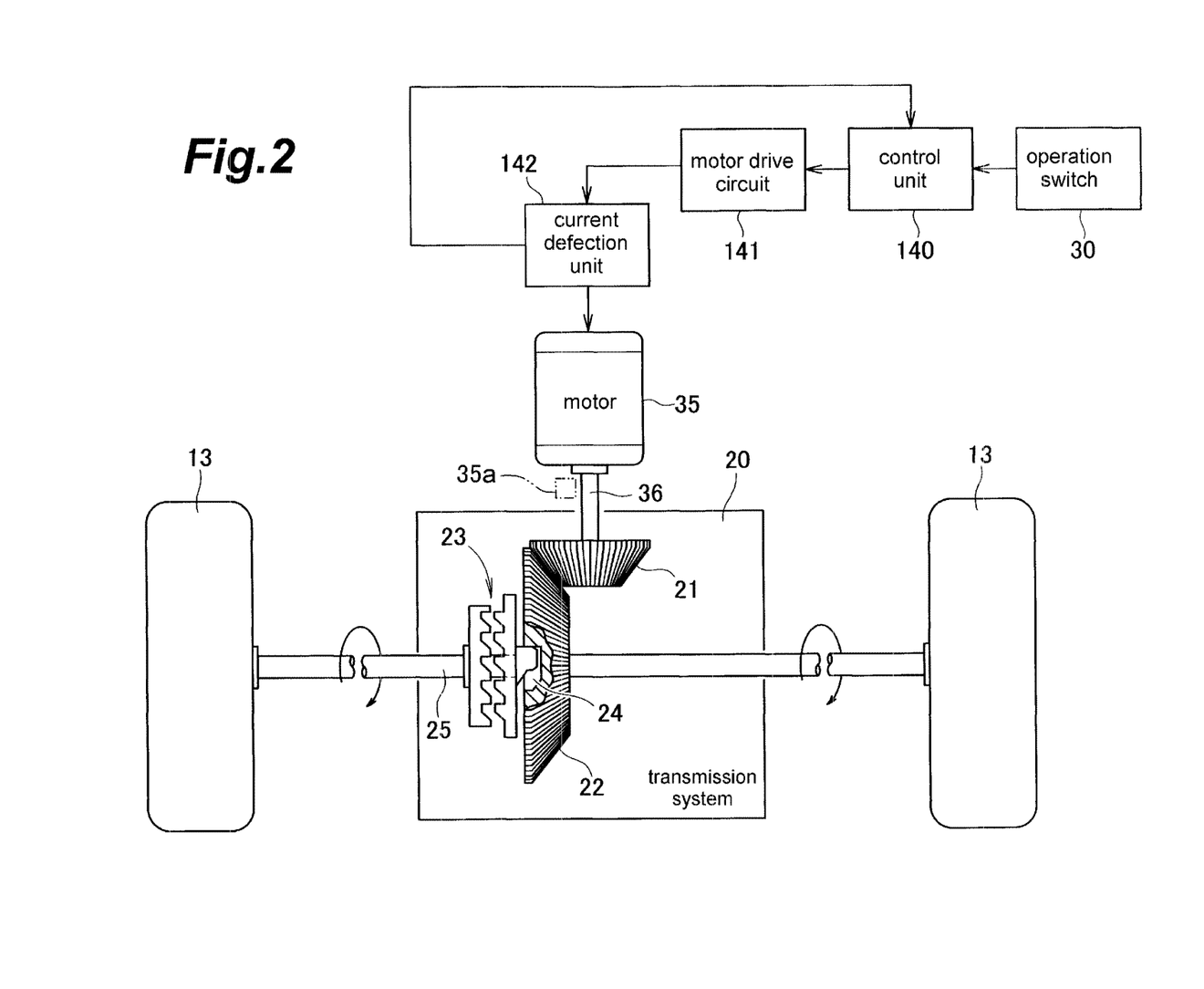
FIG. 2 is a diagram illustrating a main part of the power transmission system of the mower including a block diagram representing the control system for the electric motor.

FIG. 2 shows the overall structure of the power transmission system 20 including the control system for the electric motor 35 represented by a block diagram. The power transmission system 20 includes a drive bevel gear 21 fixedly attached to a drive shaft 36 of the electric motor 35, an axle shaft 25 extending laterally and rotatably supported by the body frame 11, a driven bevel gear 22 rotatably supported by the axle shaft 25 and meshing with the drive bevel gear 21. The driven bevel gear 22 has a greater diameter than the drive bevel gear 21. The rear wheels 13 are fixedly attached to either end of the axle shaft 25. The power transmission system 20 further comprises a dog clutch 23 and a clutch actuating mechanism 24 interposed between the driven bevel gear 22 and the axle shaft 25.

Figure 3:
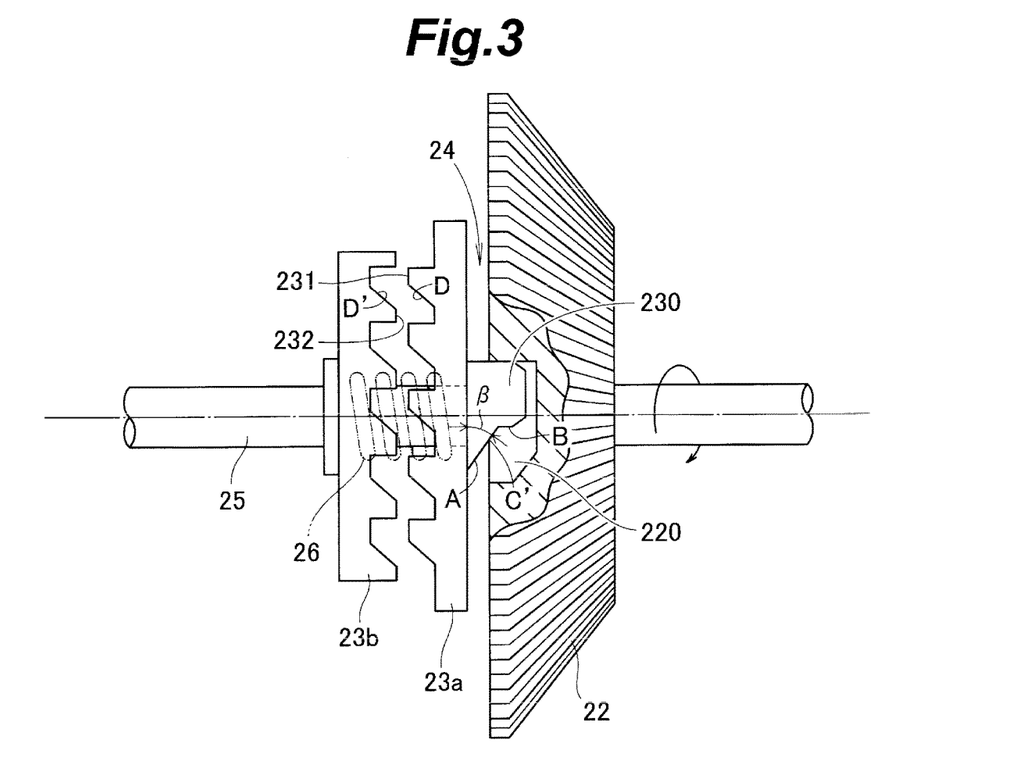
FIG. 3 is a simplified, partly broken away rear view of a part of the power transmission system.
Figure 5:
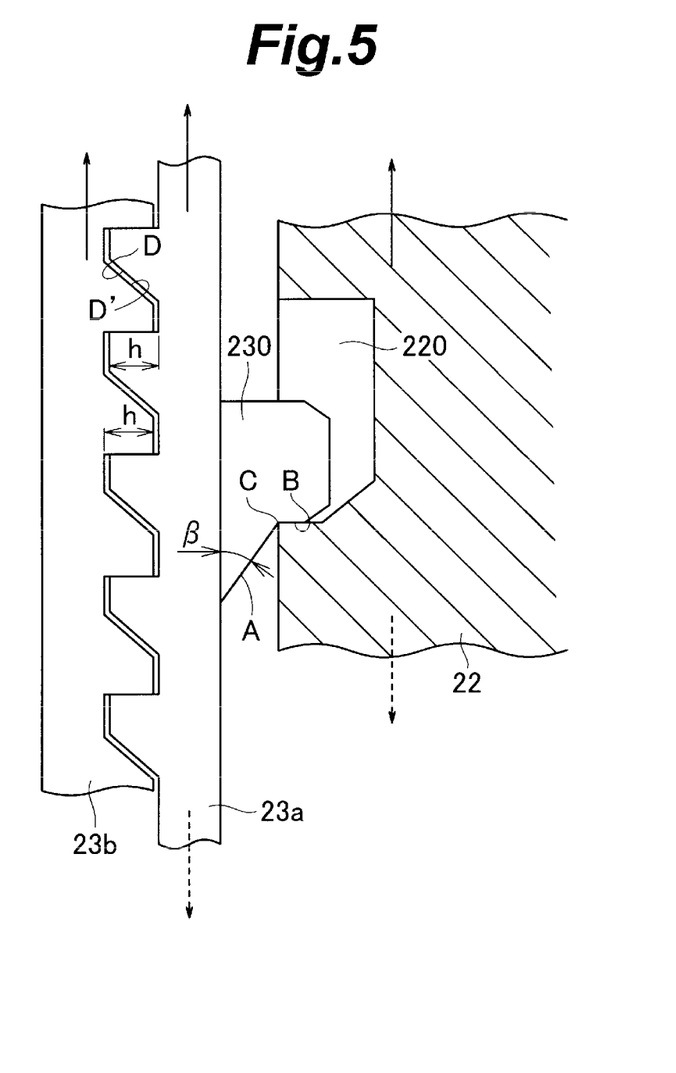
FIG. 5 is a diagram showing the relationship between the clutch actuating mechanism and the dog clutch which is actuated by the clutch actuating mechanism.
Figure 6:
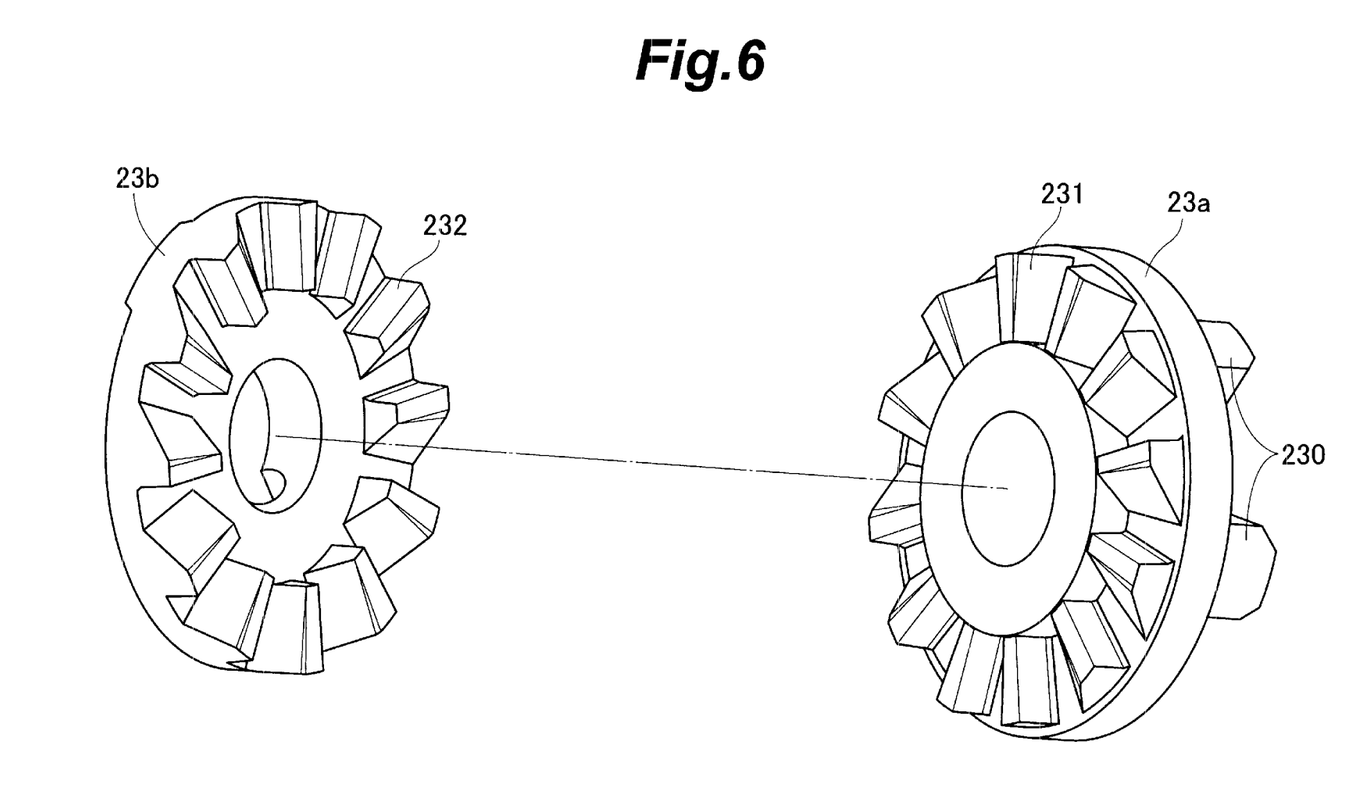
FIG. 6 is an exploded perspective view of the dog clutch.

As shown in FIGS. 3 and 6, the dog clutch 23 is provided with a first clutch half 23a (the input end) having a plurality of teeth 231 projecting in the axial direction and arranged at a regular interval in a coaxial manner. The first clutch half 23a is rotatably supported on the axle shaft 25. The dog clutch 23 is further provided with a second clutch half 23b (the output end) having a plurality of teeth 232 projecting in the axial direction toward the teeth 231 of the first clutch half 23a and arranged at a regular interval in a coaxial manner in a similar fashion. The second clutch half 23b is fixedly attached to the axle shaft 25. The two sets of teeth 231 and 232 are configured to mesh with each other in a power transmitting relationship when the two clutch halves 23a and 23b are axially brought together. As best illustrated in FIG. 5, the teeth 231 are each provided with an asymmetric trapezoidal shape (as seen along the circumferential direction) including an upright surface and a slanted ramp surface (D, D'). Depending on the relative rotational direction between the first clutch half 23a and the second clutch half 23b, the opposing upright surfaces abut each other or the opposing ramp surfaces (D, D') abut each other as the case may be.

As shown in FIG. 3, the dog clutch 23 is configured to be engaged when the two clutch halves 23a and 23b are brought together by the clutch actuating mechanism 24 and rotate in the direction to cause the opposing upright surfaces of the teeth 231 and 232 to abut each other. The dog clutch 23 is disengaged when the two clutch halves 23a and 23b are displaced away from each other or when the two clutch halves 23a and 23b rotate in the direction to cause the opposing ramp surfaces of the teeth 231 and 232 to abut each other.

Figure 7:
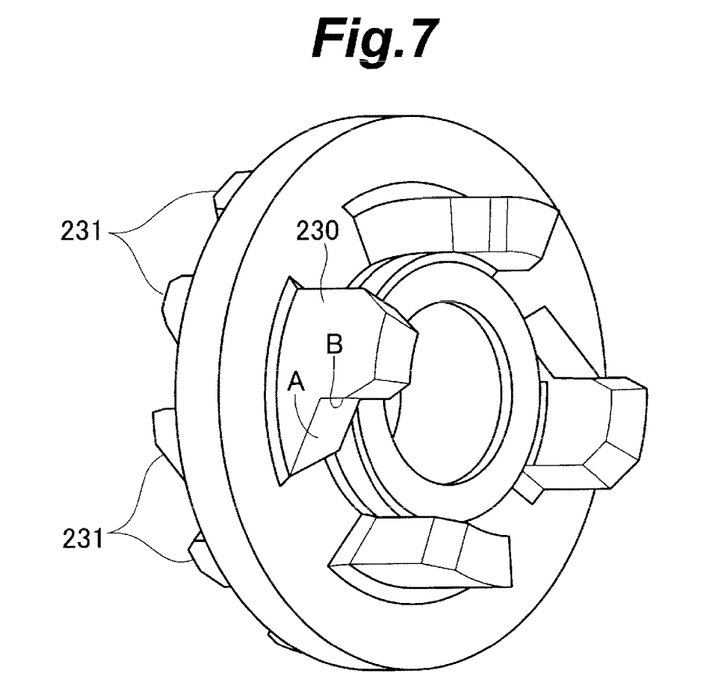
FIG. 7 is a perspective view of the back side of the first clutch half of the dog clutch provided with projections forming a part of the clutch actuating mechanism.

The clutch actuating mechanism 24 includes a plurality (four, in the illustrated embodiment) of recesses 220 formed on the back side of the driven bevel gear 22 at a regular angular interval in a concentric arrangement, and a same number of projections 230 projecting axially from the back side of the first clutch half 23a (facing away from the teeth 231 thereof) (as best shown in FIG. 7) and received in the corresponding recesses 220.

The first clutch half 23a is moveable in the axial direction away from the second clutch half 23b at least by a stroke large enough for the two sets of teeth 231 and 232 to be disengaged from each other. Optionally, in order to ensure a rapid disengagement of the dog clutch 23, as indicated by imaginary lines in FIG. 3, a compression coil spring 26 may be wound around the part of the axle shaft 25 located between the two clutch halves 23a and 23b to normally urge the first clutch half 23a away from the second clutch half 23b.

Figure 4:
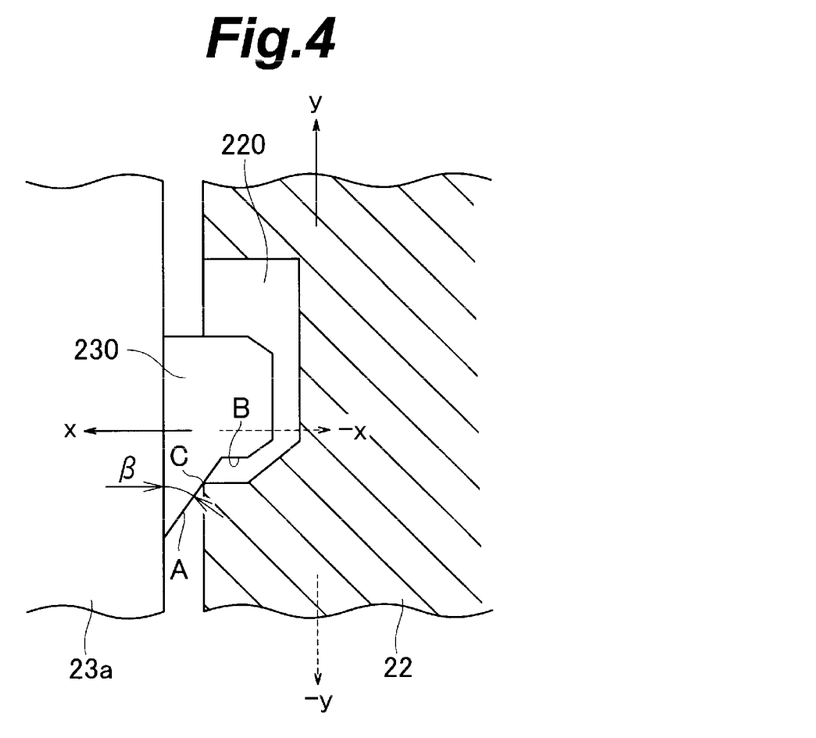
FIG. 4 is a diagram illustrating a part of the clutch actuating mechanism.

As shown in FIGS. 3 and 4, each recess 220 is provided with a pair of upright wall surfaces on either circumferential end thereof which are perpendicular to the planar back surface of the driven bevel gear 22 (which is in turn perpendicular to the central axial line of the axle shaft 25). One of the circumferential ends of each projection 230 is defined by an upright wall surface which is perpendicular to the planar back surface of the driven bevel gear 22, and the other circumferential end of the projection 230 is defined by a ramp surface A, a small upright surface B and a chamfer surface extending from the base end of the projection 230 in that order.

Therefore, during the normal operation of the mower (the normal rotations of the electric motor 35), the vertical drive shaft 36 rotates in clockwise direction when viewed from above owing to the rotative power of the electric motor 35. This causes one of the upright wall surfaces of each recess 220 to be pushed against the ramp surface A of the corresponding the projection 230. This in turn causes an axial movement of the first clutch half 23a toward the other clutch half 23b. As a result, the dog clutch 23 becomes engaged, and the rotational power of the electric motor 35 is transmitted to the axle shaft 25 and, hence, to the two rear wheels 13. Thus, the projection 230 and the recesses 220 jointly form a cam mechanism that coverts the rotational motion of the driven gear 22 into an axial movement of the first clutch half 23a.

Conversely, when the electric motor 35 is driven in the opposite direction such that the other upright wall surface of each recess 220 to be pushed against the corresponding upright surface of the corresponding projection 230. This in turn causes an axial movement of the first clutch half 23a away from the other clutch half 23b owing to the abutting of ramp surfaces D and D' of the teeth 231 and 232 with each other. As a result, the dog clutch 23 becomes disengaged, and the rotational power of the electric motor 35 is not transmitted to the axle shaft 25 and, hence, the two rear wheels 13 become freely rotatable.

Thus, when the electric motor 35 is driven in the normal rotational direction, the dog clutch 23 is engaged. When the electric motor 35 is driven in the reverse rotational direction, the dog clutch 23 is disengaged.

The sloping angle β of the ramp surface A of each projection 230 is determined in dependence on the height of the teeth 231 and 232 of the two clutch halves 23a and 23b as illustrated in FIG. 5.

FIGS. 4, 5 and 7 show the details of the clutch actuating mechanism 24. Each projection 230 has a rectangular base, and four sides extending away from the base. One of the sides of each projection 230 facing the circumferential direction is provided with the ramp surface A, the upright flat surface B and the chamfer surface, in that order from the base. As the driven bevel gear 22 rotates in the direction indicated by a solid arrow (FIGS. 4 and 5) (in the normal rotational direction), an outer corner edge C of the recess 220 rides over the ramp surface A so that the first clutch half 23a is pushed toward the second clutch half 23b. As a result, the dog clutch 23 becomes engaged.

Referring now back to FIG. 2, the control system for the electric motor 35 includes a control unit 140, a motor drive circuit 141 and a current detection unit 142. The control unit 140 may consist of an electronic control unit (ECU), and is configured to reverse the rotation of the electric motor 35 from the normal rotation to reverse rotation when a motor cut signal is received from the operation switch 30. The time period during which the electric motor 35 is driven in the reverse rotational direction may be at least as long as the time period required for the dog clutch 23 to change from the engaged state to the disengaged state.

The control unit 140 determines the time period required for the dog clutch 23 to change from the engaged state to the disengaged state by detecting the changes in the current supplied to the electric motor 35 when reversing the electric motor 35. The disengagement of the dog clutch 23 can be determined by the control unit 140 according to the value of the electric current supplied to the electric motor 35 and detected by the current detection unit 142. Typically, the disengagement of the dog clutch 23 owing to the reverse rotation may be indicated by a sudden drop in the electric current supplied to the electric motor 35.

Alternatively, the rotational angle of the electric motor 35 may be detected from the signal produced from a rotational angle sensor 35a provided in conjunction with the drive shaft 36 of the electric motor 35, and the electric motor 35 is driven the reverse rotational direction until a prescribed rotational angle in the reverse rotational direction has been detected. It should be understood that transition from the engaged state of the dog clutch 23 to the disengaged state of the dog clutch 23 is completed only after a reverse drive command is issued from the control unit 140, and the drive shaft 36 has turned by a prescribed rotational angle in the reverse rotational direction (which is typically less than one revolution).

As a simplified variation of the illustrated embodiment, the time period of reversing the rotation of the electric motor 35 or the angle by which the electric motor 35 is driven in the reverse rotational direction may consist of a predetermined value which may be either fixed or variable.

The motor drive circuit 141 may essentially consist of MOS transistor switching devices which are connected in an H bridge circuit. The H bridge circuit includes a pair of high side arms including the high side switching devices, respectively, which are connected to the positive terminal of a battery not shown in the drawings and a pair of low side arms including the low side switching devices, respectively, which are connected to the ground. The control unit 140 reverses the rotation of the electric motor 35 and thereby releases the dog clutch 23 by detecting the current conducted through a resistor connected in series with the H bridge circuit by using the current detection unit 142.

Figure 8:
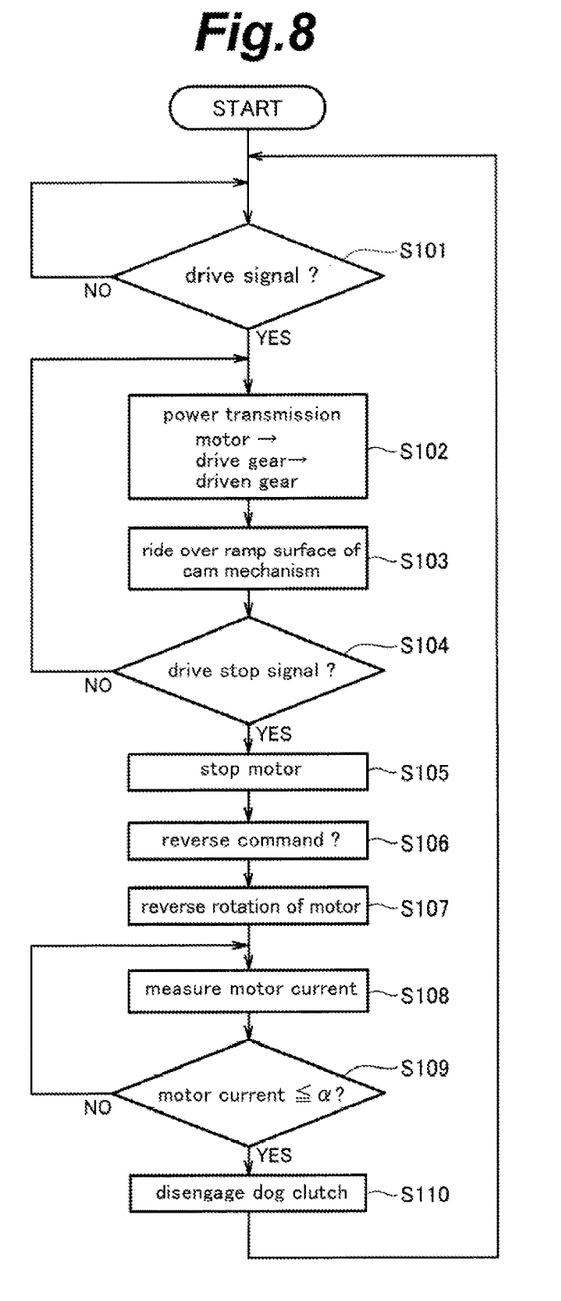
FIG. 8 is a flowchart showing the mode of operation of the power transmission system.

FIG. 8 shows a flowchart for the control of the electric motor 35 performed by the control system of the mower 10. The control process for the electric motor 35 in the mower 10 is described in the following with reference to FIG. 8.

The control unit 140 constantly monitors the state of the operation switch 30. When a drive signal is supplied to the control unit 140 by pressing the operation switch 30 (Yes in step S101), the motor drive circuit 141 drives the electric motor 35 in the normal direction, and the drive force of the electric motor 35 is transmitted to the driven bevel gear 22 via the drive bevel gear 21 (Step S102).

As the driven bevel gear 22 rotates, the corner edge C of each recess 220 pushes the ramp surface A of the corresponding projection 230 so that the first clutch half 23a is displaced toward the second clutch half 23b (step S103). During this process, the ramp surfaces D and D' of the respective sets of teeth 231 and 232 slide one over the other until the two sets of teeth 231 and 232 become fully meshed, and the power is transmitted from the driven bevel gear 22 to the axle shaft 25.

When a stop signal is supplied to the control unit 140 (step S104) by turning off the operation switch 30 (step S104), the control unit 140 stops the operation of the electric motor 35 via the electric motor drive circuit 141 (step S105). At this time, as no drive force is transmitted from the axle shaft 25 to the first clutch half 23a, the first clutch half 23a and the second clutch half 23b remain to be engaged with each other.

Thereafter, the control unit 140 supplies a reverse command to the electric motor 35 (step S106), and this causes the electric motor drive circuit 141 to start driving the electric motor 35 in the reverse rotational direction (step S107). The control unit 140 constantly measures the drive current of the electric motor 35 via the current detection unit 142 (step S108). When the electric current supplied to the electric motor 35 falls below a prescribed value a during the time the electric motor 35 rotates in the reverse rotational direction, thereby indicating that the dog clutch 23 has been disengaged (Yes in step S109), the dog clutch 23 which has been stationary in the engaged state is now disengaged (step S110). In other words, the first clutch half 23a is displaced away from the second clutch half 23b (the dog clutch 23 is disengaged) owing to the sliding engagement between the ramp surfaces D and D' of the teeth 231 and 232 of the two clutch halves 23a and 23b so that the axle shaft 25 becomes freely rotatable. Then, the process flow advances to the monitoring step for the operation switch 30 (step S101) so that the state of the operation switch 30 is monitored once again, and if the operation switch 30 is turned on, the process flow of steps S102 to S110 is repeated.

As can be appreciated from the foregoing description, in the mower 10 of the illustrated embodiment, the time period required to reverse the electric motor 35 is desired to be at least as long as the time period required for the dog clutch to change from the engaged state to the disengaged state. Thus, the electric motor 35 is reversed in rotational direction only during such a short period of time that the unnecessary reverse rotation of the electric motor can be avoided, and the switch over of the dog clutch between the engaged state and the disengaged state can be accomplished in a smooth manner.

In the illustrated embodiment, the control unit 140 determines the time period for rotating the electric motor in the reverse direction according to the change in the current supplied to the electric motor 35. As the rotational condition of the electric motor 35 is detected from the change in the electric current supplied to the electric motor 35, as compared to the case where the rotation of the electric motor 35 is detected by using a rotational angle sensor, the process of disengaging the dog clutch 23 can be achieved by using a highly simple structure.

Although the present invention has been described in terms of a preferred embodiment thereof, it is obvious to a person skilled in the art that various alterations and modifications are possible without departing from the scope of the present invention which is set forth in the appended claims. The contents of the original Japanese patent application on which the Paris Convention priority claim is made for the present application as well as the contents of the prior art references mentioned in this application are incorporated in this application by reference.

The invention claimed is:

1. A walk behind mower including a driven wheel rotatably supported by a body frame, an electric motor for selectively driving the driven wheel, a clutch provided in a power transmission path between the electric motor and the driven wheel, a clutch actuating mechanism interposed between the electric motor and the clutch for selectively engaging the clutch, and a control unit for selectively supplying electric power from a power source to the electric motor according to a command from an operation switch;

wherein the clutch actuating mechanism includes a cam mechanism for engaging the clutch by using a force transmitted to an input end of the clutch in the power transmission path when the electric motor is being driven in a normal rotational direction; and wherein the control unit is configured to drive the electric motor in a reverse rotational direction for a prescribed period of time or by a prescribed angle before stopping supplying electric current to the electric motor when a command to stop supplying electric current to the electric motor is received from the operation switch.

2. The walk behind mower according to claim 1, wherein the prescribed time period or the prescribed angle is substantially equal to a time period or an angle required for disengaging the clutch from an engaged state thereof by using the cam mechanism.

3. The walk behind mower according to claim 1, wherein the prescribed time period or the prescribed angle is determined according to a change in a value of the electric power supplied to the electric motor.

4. The walk behind mower according to claim 1, wherein the prescribed time period or the prescribed angle is a predetermined value.

5. The walk behind mower according to claim 1, wherein the clutch consists of a dog clutch, the input end of the dog clutch including an input disk and a plurality of teeth extending axially from a side of the input disk at a regular angular interval in a coaxial manner, and an output end of the dog clutch including an output disk coaxially opposing the input disk and including a plurality of teeth extending axially from a side of the output disk facing the input disk at a regular angular interval in a coaxial manner.

6. The walk behind mower according to claim 5, wherein the prescribed angle is detected by an angular position sensor provided on a side of the input end of the dog clutch.

7. The walk behind mower according to claim 6, wherein each tooth of the dog clutch is provided with an upright surface and a ramp surface on respective circumferential ends thereof such that the opposing upright surfaces abut each other when the dog clutch is being driven in the normal rotational direction and the ramp surfaces abut each other when the dog clutch is being driven in the reverse rotational direction.

8. The walk behind mower according to claim 6, wherein a spring is interposed between the input end and the output end of the dog clutch to urge the input end and the output end of the dog clutch away from each other.

9. The walk behind mower according to claim 6, further including an axle shaft having a pair of driven wheels fixedly attached to either end thereof and rotatably supported by the body frame, a driven gear rotatably supported by an intermediate part of the axle shaft, and a drive gear rotatably supported by the body frame and connected to a drive shaft of the electric motor;

wherein the dog clutch is coaxially mounted on the axle shaft in such a manner that the output end is fixedly secured to the axle shaft and the input end is rotatably supported on the axle shaft, and the clutch actuating mechanism comprises at least one axial projection projecting from one of the input end and the driven gear, and at least one recess provided in the other of the input end and the driven gear, the cam mechanism being formed between the projection and the recess in such a manner that the input end is displaced toward the output end when the drive force in the normal rotational direction transmitted from the electric motor is transmitted to the clutch actuating mechanism.

10. The walk behind mower according to claim 9, wherein the cam mechanism includes a ramp surface formed in the at least one projection.

11. The walk behind mower according to claim 9, wherein the drive gear comprises a bevel gear fixedly attached to the drive shaft of the electric motor extending vertically, and the driven gear comprises a bevel gear rotatably supported by the axle shaft in a coaxial relationship.

* * * * *